May 17, 1966  H. FÜHRING  3,251,473
MEANS FOR FILTERING THE SOLVENT USED IN CHEMICAL
CLEANING MACHINES
Filed Oct. 25, 1962
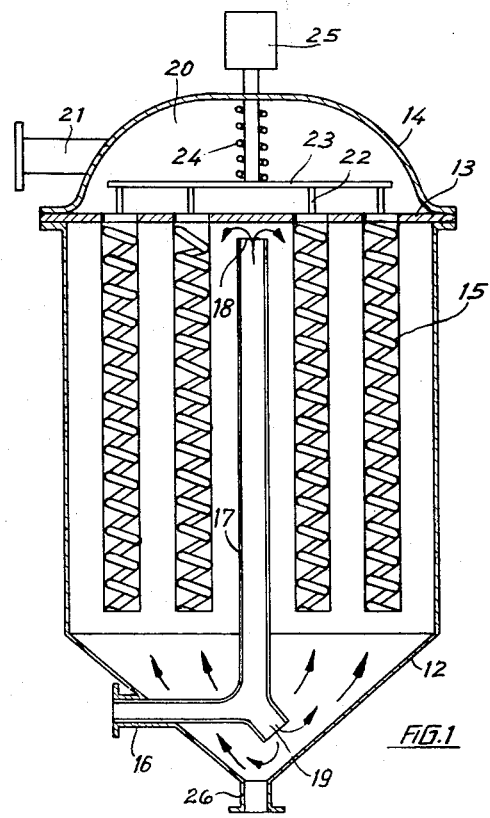
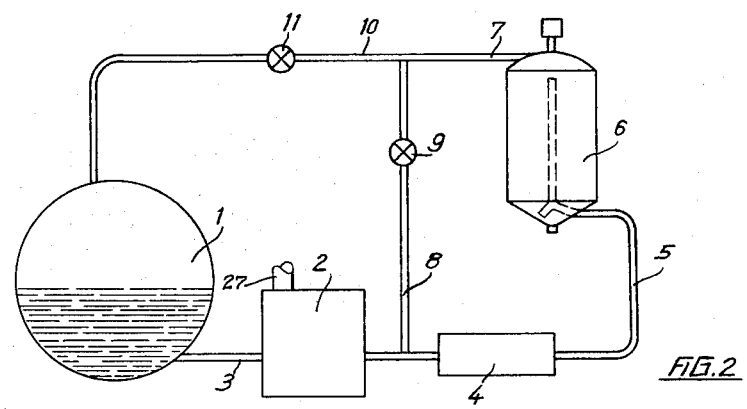
INVENTOR.
HEINRICH FÜHRING
BY
ATTORNEY

United States Patent Office 3,251,473
Patented May 17, 1966

3,251,473
MEANS FOR FILTERING THE SOLVENT USED IN CHEMICAL CLEANING MACHINES
Heinrich Fuhring, Augsburg, Germany, assignor to Max Bohler and Ferdinand Weber, Augsburg, Germany
Filed Oct. 25, 1962, Ser. No. 233,099
Claims priority, application Germany, Oct. 27, 1961, B 64,563
4 Claims. (Cl. 210—332)

The invention relates to means for filtering the solvent laden with impurities inside the filter casing of a chemical cleaning machine.

In cleaning machines worked on what is called the "single-charge" principle, the filtering medium in the pin trap is added to each charge and carried into the filter casing along with the solvent. As each charge is finished, it is drained to the distiller tank or sludge filter tank. This method has the advantage that it enables small filter casings and small quantities of solvent to be used. Because the filtering medium is deposited afresh each time on the filter, efficiency is highest at the start of filtration. The disadvantage of this single-charge system, however, is that the sludge has to be evacuated after every charge and some of the solvent is carried away with it for distillation. Where the soap concentration in the solvent is high, this necessarily means that the loss of soap is greater.

In chemical cleaning machines worked on the multiple-charge principle, the filtering medium used for the basic sedimentation is first introduced into the filter casing and a supplementary dose of filtering medium is then given, charge by charge. Thus, the filter cake is continually accumulating throughout the day in the sediment filters, and is held against the filter elements by the continuous current. This constant growth of filter cake steadily reduces the filtering capacity. Moreover, such a filter needs a greater surface area, and hence also a larger filter casing, than required for single-charge filters.

Since, with multiple-charge filters, the sludge is not evacuated charge by charge, but remains in the filter casing, soap wastage at high concentrations is smaller, by comparison with the single-charge method.

The problem to be solved by the invention is therefore how to to obtain the benefits of both methods, without their drawbacks.

In operating the device of the invention the filtering medium is added to the solvent from the cleaning drum in a single quantity sufficient for several charges—for example for one day's work—and inside the filter casing it is floated on to the filter elements afresh at the start of each charge, the accumulating filter cake being removed from the filter elements after each charge without leaving the filter casing.

This principle, on which the invention is based, can with advantage be put into effect by utilising the energy of the solvent, as it flows into the filter casing, to cause an upsurge in the heavy substances collecting at the bottom of the filter casing, while the lighter materials, for example fluff, settling on the surface of the liquid, are caused to mix with the rising particles. This enables an even formation of filter cake on the filter elements to be obtained.

The invention secures the benefits of the familiar single-charge principle, to the extent that a small filter casing is used, in which the filter cake can form afresh, charge by charge. As a result, the filter actually works more efficiently at the beginning of each charge than is the case with the familiar multiple-charge principle. On the other hand, the disadvantages of the single-charge principle are avoided, because the soap stays in the filter casing, since this needs only to be cleared out, for example in the evening. To that extent, too, the advantage of the multi-charge system is preserved; but its disadvantages are absent, in that the means according to the invention differs from multiple-charge machines in requiring a smaller filter casing while providing a greater filtering capacity.

One recommended means covered by the invention comprises a filter casing with a number of filter elements inside. With a filter casing of this kind, the essential feature of the invention lies in the fact that the pipe conveying the solvent into the filter casing is provided with two outlets, one of which takes the form of a riser extending to the top of the casing, while the other is directed downwards in the usual way, towards the funnel-shaped bottom part of the casing. This arrangement enables turbulence to be set up inside the filter casing, as result of which the particles collecting at the surface are mixed again and again with the heavier particles of sediment.

It is also possible to apply the principle of the invention by using special agitator equipment, fitted inside the filter casing; but such equipment would undoubtedly make the plant more expensive, apart from the fact that special precautions would have to be taken to avoid leaks, so as to prevent loss of solvent by evaporation.

The upper outlet, in the means according to the invention, is best placed immediately below a plate which serves to close off the filter casing, the filter elements being secured to this plate under tension. In this way, the solvent discharged through the outlet is thrown back from the plate and directed downwards, so that a continuously circulating current is produced. On the other hand, it is better if the outlet which discharges downwards is placed outside the longitudinal axis of the casing, so as to produce not only an upward, but at the same time a rotary current. It is not unknown for a solvent feed pipe to be led into the filter casing below a set of filter elements, the discharge outlet being directed downwards, so that the solvent as it emerges strikes the conical-tapered bottom of the casing and is caused to flow upwards. This arrangement, however, is not in itself sufficient to satisfy the requirements of the method of the invention, since the lighter suspended materials, and more particularly fluff, cannot be made to mix with the upward flow of heavier particles of sediment. The fluff may therefore choke the upper parts of the filter elements.

Finally, it has been found particularly advantageous to use filter elements consisting of coil springs, the turn spacing of which can be altered by means of pusher rods carried through the closing plate of the casing. The main purpose of such an arrangement is to provide the distinguishing feature of the method of the invention which calls for the filter cake to be removed from the filter elements after each charge, without the sludge being discharged from the filter casing. The operation of these coil springs can be controlled for outside.

These and other features of the invention are diagrammatically illustrated by way of example in the accompanying drawing, in which FIGURE 1 is a diagrammatic longitudinal section through a filter casing, and FIGURE 2 is a diagram of a cleaning machine.

The operation of the cleaning machine is made clear in FIGURE 2. The solvent in cleaning drum 1 is led through pipe 3 to a pin trap 2. With the initial charge, this solvent has added to it, through inlet 27, a generous amount of filtering powder, sufficient for several charges and preferably for one day's work. The solvent and filtering powder pass by way of pump 4 and pipe 5 to filter casing 6. The solvent that has passed through the filters, but has not yet been completely freed from impurities, is taken through a by-pass circulating system 7/8, back to pump 4 and so through filter casing 6 once more.

Then, after a fairly short period, cock 9 is closed and cock 11 opened, so that the solvent leaving filter casing 6 can pass through pipes 7 and 10, back to the drum 1. From the drum 1 it is again pumped out by pump 4, but without needing to have further filtering powder added to it in pin trap 2, since the amount of filtering powder in casing 6 is adequate for the filtration of the charges that follow. The cake deposited on the filter elements is removed after every charge, but does not leave the casing. At the beginning of each charge, the filter cake starts accumulating afresh on the filter elements.

An important feature of the invention is that the flow of solvent is admitted in such a way as to produce an upsurge of the heavier sediment and cause the lighter suspensions to intermingle with it, so that, on the one hand, a homogeneous filter cake is produced and, on the other, choking of the filter elements with fluff is prevented.

One successful form for filter unit 6 which fulfills these conditions is shown diagrammatically, by way of example, in FIGURE 1. Casing 6 has the usual conically tapered bottom 12, and at the top a plate 13, which extends right through the casing and has the various filter elements 15 connected to it under tension. The method of fitting such filter elements 15 is not in itself unusual, so a detailed description of this may be omitted. Above plate 13, domed cover 14 forms a hollow space 20 for the filtered solvent.

The solvent enters the filter casing 6 through the medium of an inlet assembly at an inlet pipe 16 thereof, and passes into riser pipe 17, which has one outlet 18 near the plate 13, and another outlet 19, near the bottom of the casing, 12. The upper outlet 18 should be as close as possible to plate 13, in order that the solvent, as it emerges, may strike plate 13 and be swept back. Similarly, the solvent emerging from the bottom outlet 19 should be made to flow upwards through striking against the conical surfaces formed by the tapered bottom 12. The intention is that the heavier materials, which tend to settle rapidly, will thus be swirled upwards, while outlet 18 will prevent the lighter suspensions, for example fluff, from being deposited on the upper portions of the filter elements and blocking them.

A further possibility is for each of the outlets 18 and 19 to consist of nozzles of some kind, so as to subdivide the outflow of solvent. Most important of all, it will be found that the best arrangement for outlet 19 is off-centre and skewed, so that the upward current takes the form of a rotary turbulence. This will not be readily obtainable if the outlet lies symmetrically on the longitudinal axis of casing 6.

In the example shown, filter elements 15 have the familiar form of coil springs, the turns of which are locally or continuously kept apart so as to produce narrow apertures. The solvent inside casing 6, introduced through pipe inlet 16, has to pass through the apertures in filters 15, before the mounting pressure can carry it into space 20, above filter plate 13. Filter plate 13 contains openings opposite filter elements 15, but only the solvent inside filter elements 15 can flow through these openings.

To enable the filter cake to be removed from filter elements 15 after every charge, pusher rods 22 are provided. The pusher rods, in the construction shown, pass through filter elements 15 and extend to the bottom of the filter elements. When rods 22 are pushed downwards, the springs in the filter elements are expanded, so enlarging the apertures in them. This causes the accumulated filter cake to fall rapidly away from filter elements 15 and to collect at the bottom of casing 6, without its being necessary to evacuate the sludge. Rods 22 are connected by a yoke 23, which can be moved up and down by means of spring-loaded pin 24 and actuator 25. The actuator 25 may take the form of a motor fitted, for example, with an eccentric, or the like, which is set in motion from time to time and cleans filter elements 15. The cleaned solvent is then discharged through outlet connection 21 and arrives back in pipe 7 (FIGURE 2). The outlet for the sludge is 26.

The removal of the filter cake from the filter elements, for example, can also be effected by means of compressed air, or by flushing in the opposite way, etc. The invention is thus not confined to the construction shown in FIGURE 1, but includes all such variance as can readily be applied to carrying out the process covered by the invention.

I claim:
1. Apparatus for filtering the solvent used in a cleaning machine comprising, in combination:
   a filter casing having a bottom portion of conical configuration;
   a plate extending across the casing at one end thereof;
   a plurality of filter elements disposed within the casing, said filter elements being positioned upon said plate and suspended therefrom;
   an inlet assembly for introducing solvent into the casing only at a single location, said assembly having a branched location within the casing, and comprising:
   a plurality of outlets for the solvent within the casing;
   one of the outlets being defined by a riser pipe extending upwardly into the casing from said branched location, said one outlet being disposed adjacent and opening towards said plate for introducing a substantially continuously circulating current from said one end of the casing to another end of the casing to preclude lighter suspensions from being deposited upon and clogging portions of the filter element;
   another one of said outlets extending and opening towards the conical bottom of the casing from said branched location for introducing a rotational current from the said other end of the casing to said one end thereof to cause the heavier materials introduced into the casing to flow towards the lighter suspensions, enabling a homogeneous intermingling of the heavier materials and lighter suspensions.

2. Apparatus as defined in claim 1, wherein:
   said plate extending across the casing defines a space therewith at said one end thereof within which a filtered medium is to be received; and wherein:
   said other outlet is disposed in an eccentric relationship with respect to said one outlet.

3. Apparatus as defined in claim 2, wherein said plate comprises:
   a plurality of apertures extending therethrough; and wherein:
   said filter elements each comprise:
   a spring under tension suspended from the plate;
   said springs having a plurality of turns to define variable area apertures through which a solvent separated from impurities is particularly adapted to pass, enabling the filtered solvent to thence pass through the apertures in the plate and into the space defined thereby.

4. Apparatus as defined in claim 2, wherein there is further provided:
   means for causing the expansion and contraction of the springs, enabling the filter cake that forms upon the turns thereof as a result of an intermingling of the filter medium and heavier materials to be removed therefrom subsequent to a filtering cycle and to remain in the casing subsequent to each preceding filtering cycle for use during a number of succeeding successful filtering cycles.

(References on following page)

References Cited by the Examiner

UNITED STATES PATENTS

| | | | |
|---|---|---|---|
| 2,487,769 | 11/1949 | Ebert et al. | 210—332 |
| 2,549,063 | 4/1951 | De Haven | 210—193 X |
| 2,570,131 | 10/1951 | Koupal | 210—193 X |
| 2,687,632 | 8/1954 | Gates | 210—75 X |
| 2,784,846 | 3/1957 | Olson et al. | 210—333 |
| 2,862,622 | 12/1958 | Kircher et al. | 210—333 |
| 3,055,290 | 9/1962 | Arvanitakis | 210—332 X |

REUBEN FRIEDMAN, *Primary Examiner.*

HERBERT L. MARTIN, *Examiner.*

S. ZAHARNA, *Assistant Examiner.*